United States Patent
Doty et al.

[19]

[11] Patent Number: 6,106,013
[45] Date of Patent: Aug. 22, 2000

[54] CONTROLLED FORCE SHOULDER BELT SYSTEM

[76] Inventors: Gerald Arthur Doty, 2605 Greenstone Dr., Auburn Hills, Mich. 48326; Richard M. Grabowski, 12391 Carriage Trail, Davisburg, Mich. 48350; Mark Lynn Wilsey, 1866 Hamilton, Okemos, Mich. 48864

[21] Appl. No.: 08/722,085
[22] PCT Filed: Jun. 28, 1996
[86] PCT No.: PCT/US96/11148
  § 371 Date: Sep. 12, 1997
  § 102(e) Date: Sep. 12, 1997
[87] PCT Pub. No.: WO97/02162
  PCT Pub. Date: Jan. 23, 1997

Related U.S. Application Data

[60] Provisional application No. 60/000,618, Jun. 30, 1995.
[51] Int. Cl.[7] .................................................. B60R 22/36
[52] U.S. Cl. ........................ 280/806; 242/379.1; 280/805
[58] Field of Search .................................. 280/805, 806; 297/470, 471, 472; 242/379.1

[56] References Cited

U.S. PATENT DOCUMENTS

| | | |
|---|---|---|
| 3,632,060 | 1/1972 | Balder .................................. 242/107.4 |
| 3,790,099 | 2/1974 | Beller . |
| 3,927,846 | 12/1975 | Meissner . |
| 3,952,967 | 4/1976 | Barile et al. ...................... 242/107.4 R |
| 4,158,403 | 6/1979 | Peter ........................................ 188/1 C |
| 4,323,205 | 4/1982 | Tsuge et al. ...................... 242/107.4 A |
| 5,340,046 | 8/1994 | Schroth et al. .......................... 242/407 |
| 5,511,739 | 4/1996 | Dybro et al. . |
| 5,547,143 | 8/1996 | Miller, III et al. . |
| 5,558,295 | 9/1996 | Bauer . |
| 5,626,306 | 5/1997 | Miller, III et al. ................... 242/379.1 |

Primary Examiner—Eric Culbreth
Attorney, Agent, or Firm—Fitch, Even, Tabin & Flannery

[57] ABSTRACT

A seat belt retractor is provided with an energy management system that achieves a known, predictable dissipation of energy which allows the force load on the shoulder belt and an amount of belt protraction to be carefully controlled for a given vehicle's crash characteristics. At shoulder belt loads below the onset force level, the inertia or web-sensitive locks lock both the reel and reel shaft against rotation and belt protraction with no energy dissipation. At shoulder belt loads above the onset force level, the reel rotates relative to the locked shaft and moves an extrusion die and a bushing on the reel shaft relative to one another and deforms the wall of the bushing thereby dissipating energy. The extrusion die can be formed integrally on the reel shaft with the driver nut pushing the bushing axially onto the die section of the shaft to deform the bushing. The energy dissipation is consistent and predictable and done without a substantial increase in size of the seat belt system and at a modest additional cost.

14 Claims, 11 Drawing Sheets

CONTROLLED FORCE SHOULDER BELT SYSTEM

CROSS-REFERENCE TO RELATED APPLICATION

This application is a Continuation-In-Part of United States provisional patent application Ser No. 60/000,618, filed on Jun. 30, 1995 and entitled "CONTROLLED FORCE SHOULDER BELT SYSTEM."

FIELD OF THE INVENTION

This invention relates to a safety belt energy management system for dissipating energy during an accident and, more particularly, to a seat belt retractor having an energy management system built therein.

BACKGROUND OF THE INVENTION

In an effort to improve the overall performance of occupant safety systems, particularly where an air bag is to be deployed, energy management or dissipation systems are being proposed to dissipate energy and reduce the maximum forces being applied to the passenger's chest and to reduce head injuries. The latter is often termed "lowering head injury criteria" or HIC for short. Many of these proposed energy management systems involve large, cumbersome structures that are not easily mounted in the same space as are current seat belt retractor systems. Other systems are very complex and are subject to inconsistent or unpredictable results, such as can occur when metal pieces tear during energy dissipation.

There is a need for an energy management system that will provide consistent known or predictable results of reducing substantially the amount of deflection of the passenger's chest, the maximum G's being experienced, the maximum shoulder load being experienced, etc. It will be appreciated that vehicles have varying parameters because of their size, shape and interior seating arrangements. This results in different spaces between the passenger and a steering wheel, windshield, dashboard, or the like. Different vehicles will have different energy absorption characteristics and different time intervals for deployment to an effective positioning of an air bag, as well as various other parameters that make for different crash characteristics for different vehicles. Because of such different crash characteristics, vehicle manufacturers would prefer an energy management system that can be matched or tuned to their specific needs for each kind of vehicle. This has not heretofore been attained. For example, energy management systems have been suggested that dissipate energy by the tearing of metal or use materials that will not provide consistent, predictable energy dissipation for one particular vehicle's crash characteristics much less be able to be tuned, with suitable adjustments, to a plurality of crash characteristics for different vehicles.

It is desirable to be able to tune the energy dissipation in a manner such that the energy dissipation does not occur until an initial predetermined force level is reached, which usually occurs during the time that the air bag is being deployed and inflated. This initial predetermined force level is hereinafter termed the threshold or onset force level, and it should be adjustable for different vehicles and set to a specific force level, for example, 700 lbs. of tensile force on the shoulder belt. After the reaching of the onset force level, the energy dissipation then begins with some belt protraction as deformation of materials occurs in the energy dissipation system. For vehicles having a small spacing between the passenger and an adjacent portion of a vehicle, it may be desirable to let the shoulder force rise more sharply with time than for other vehicles where there is a larger spacing between the passenger and an adjacent portion of the vehicle. In the latter instance, it may be desirable that greater energy absorption is done initially to avoid a sharp rise in the shoulder belt load, so that the passenger's shoulder belt load is maintained substantially level or constant over the length of shoulder belt protraction. Another variable is the length of belt protraction which the manufacture will allow during energy dissipation, and this appears to range from a low of about six (6) inches to a high of about twenty (20) inches of belt protraction. Another factor or variable is the length of time over which the energy dissipation has to occur. Usually a six-inch belt protraction occurs more quickly than a twenty-inch belt protraction.

Energy absorption systems should be effective to lower the HIC, the shoulder belt loads, the G loads, and chest or sternum deflection. To these ends, they should absorb such energy to decrease and smooth out large, sharp increases of shoulder loads or chest deflections to more lower, known amounts of shoulder belt forces and chest deflections in a known and consistent manner. The preferred energy management system should be able to provide predictable, known energy dissipation data to the vehicle manufacturer with respect to force, time and belt protraction that is tuned to a particular vehicle's crash characteristics.

Preferably, such a system will allow the use of known and proven retractor mechanisms and be relatively simple and inexpensive. Also, the energy dissipation mechanism is preferably small so that the seat belt system can be placed in its usual space and location.

SUMMARY OF THE INVENTION

In accordance with the present invention, there is provided a new and improved energy management system that can be tuned to a vehicle's crash characteristics to provide a consistent, known load force on the shoulder belt, and a predetermined amount of belt protraction over time. This is achieved by controlling the onset force level and controlling the rate of metal deformation and energy dissipation. For example, the rate of metal deformation and energy dissipation, which is allowed immediately after the initial onset force level, may be varied to let the shoulder belt force load rise sharply or slowly and varied to smooth the force level to a substantially parallel load line or to a non-constant load line with various forces being present as the belt is protracted and energy is dissipated.

This energy management system is particularly useful during the time delay period during which an air bag is deployed and during which an additional protraction of the seat belt is being allowed. The preferred system is very small and compact and is mounted internally within the seat belt retractor, which may have its usual shape, size and locking mechanisms and operate in the usual manner until the onset force load is present. In this system, the locked reel is allowed to rotate about its supporting reel shaft and to deform internal members to dissipate energy as the reel rotates and pays out the seat belt.

Preferably, the energy dissipation assembly includes a driver which is mounted for rotation with the reel so long as the belt tension loads are below the onset or threshold level of 700 lbs. At forces above this threshold level, the belt load is sufficient to cause the driver to travel axially along the reel shaft and to deform the energy dissipator element. In one embodiment of the invention, matched for a particular vehicle's crash characteristics, the force level between the occupant and belt is kept within a narrow predetermined constant range over the time of energy absorption.

The preferred embodiment of the invention employs a tubular member which is formed of predetermined material and has a predetermined wall thickness along the length thereof. The tubular member may have a constant wall thickness or the wall thickness may be varied to change how much force is required to deform it. An extruder die is preferably formed with a contoured surface larger in diameter than the tubular wall so that the die expands the tubular wall. The preferred die is formed with a raised bead and at least one smaller diameter relief surface thereon and may be formed with one large diameter bead or a contoured surface. The tubular member usually has either a constant diameter or different stepped diameters providing different wall thickness. In another embodiment where a sharp initial rise in belt loading is desired, the die is restrained relative to the deformable wall by a restraining member, such as a shear pin, that breaks at the onset force level causing an initial, very large force to be applied.

DETAILED DESCRIPTION OF THE PREFERRED EMBODIMENT

Figure 1:
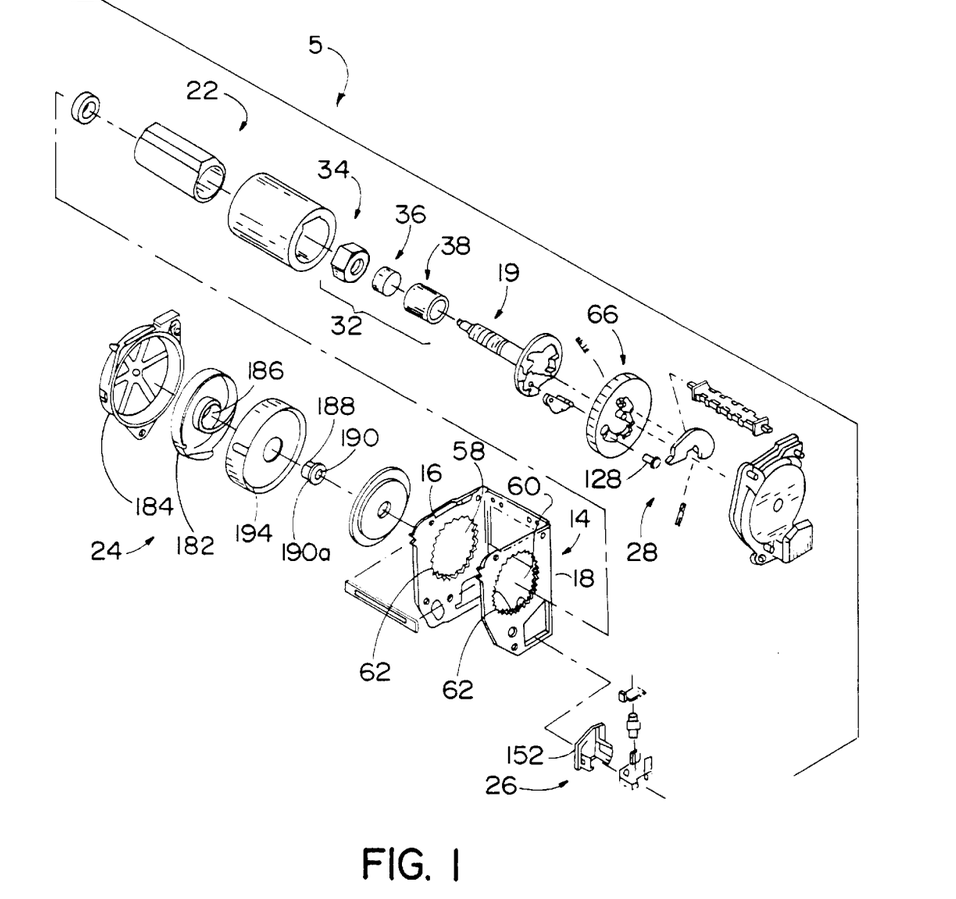
FIG. 1 is an exploded perspective view of a retractor according to the invention having an energy management system and showing a reel frame, a reel cylinder assembly, a shaft assembly, a driving and extruding mechanism and inertia reel lock assemblies.
Figure 8A:
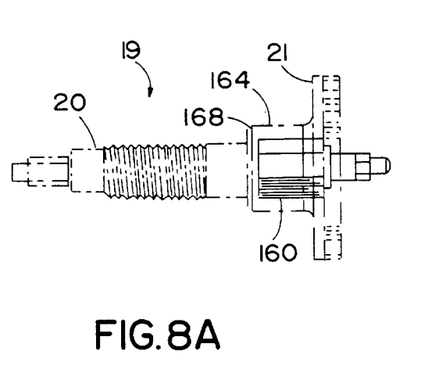
FIG. 8A is a side elevational view of the shaft assembly.
Figure 8B:
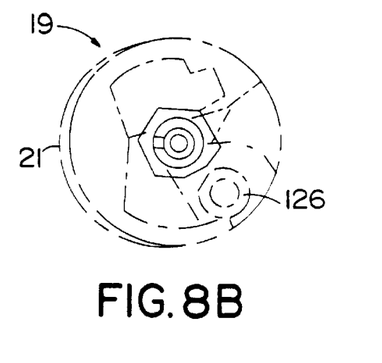
FIG. 8B is a front elevational view of the shaft assembly showing the shaft head.
Figure 9A:
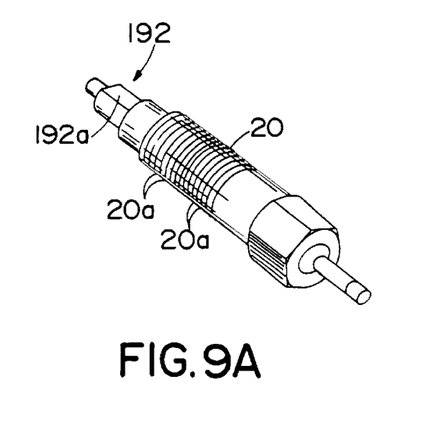
FIG. 9A is a perspective view of the reel shaft of the shaft assembly of FIGS. 8A and 8B.
Figure 9B:
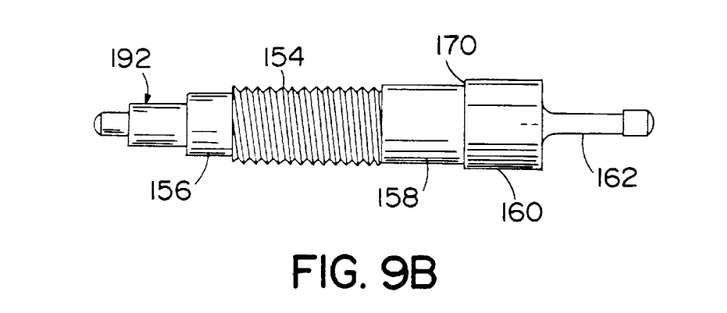
FIG. 9B is an enlarged side elevational view of the reel shaft of FIG. 9A.
Figure 10A:
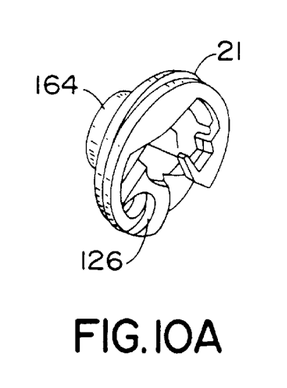
FIG. 10A is a perspective view of the shaft head of the shaft assembly of FIG. 8A and 8B.
Figure 10B:
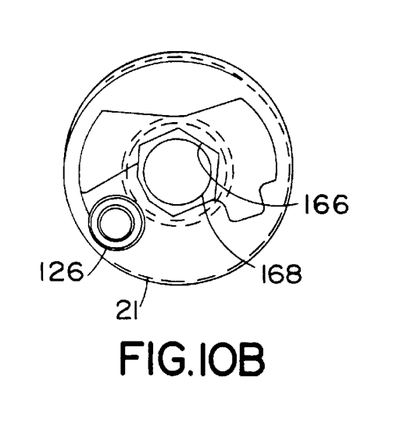
FIG. 10B is a front elevational view of the shaft head of FIG. 10A.

As shown in the drawings for purposes of illustration, the invention is embodied in a retractor 5 (FIGS. 1 and 2) having a seat belt energy management system 10 to dissipate energy. The retractor 5 has a length of seat belt webbing 12 (FIG. 13B) for restraining an occupant of a vehicle in which the retractor 5 is mounted. Manifestly, the retractor 5 can take on a wide variety of forms while still incorporating the various features of the inventive seat belt system 10 herein. The illustrated and preferred retractor 5 includes a generally U-shaped frame 14 having a pair of opposing end walls 16 and 18 between which is a reel assembly 22 and its reel shaft assembly 19 (FIGS. 8A and 8B). The shaft assembly 19 includes threaded reel shaft 20 (FIGS. 9A and 9B) having an annular shaft head 21 (FIGS. 10A and 10B) mounted at one end thereof. The reel cylinder assembly 22 is mounted for rotation on the shaft 20 with a return spring assembly 24 provided at the other end of the shaft 20 for retracting the seat belt 12 onto the reel cylinder assembly 22. At the other shaft head 21 end of the shaft 20, a conventional vehicle sensitive inertia operator 26 and web sensitive inertia operator 28 are provided which are both operable to employ a pawl and ratchet mechanism 29 to stop rotation of the reel shaft and thereby further belt protraction unless the belt load exceeds 700 lbs.

The illustrated energy management assembly is very small, compact and formed of relatively few, inexpensive parts. To this end, the retractor 5 can be provided with the energy management system that is incorporated in the retractor 5 without substantially increasing its size so the retractor may be positioned in small volume spaces without the need for a large additional space in a vehicle for the energy management system 10. This is achieved by having the energy management system disposed between the belt reel 22 and the reel shaft 19. Herein, the energy management system is activated when the tension load on the belt reaches what is hereinafter termed either the "onset force level" or the "threshold tension force".

Figure 2:
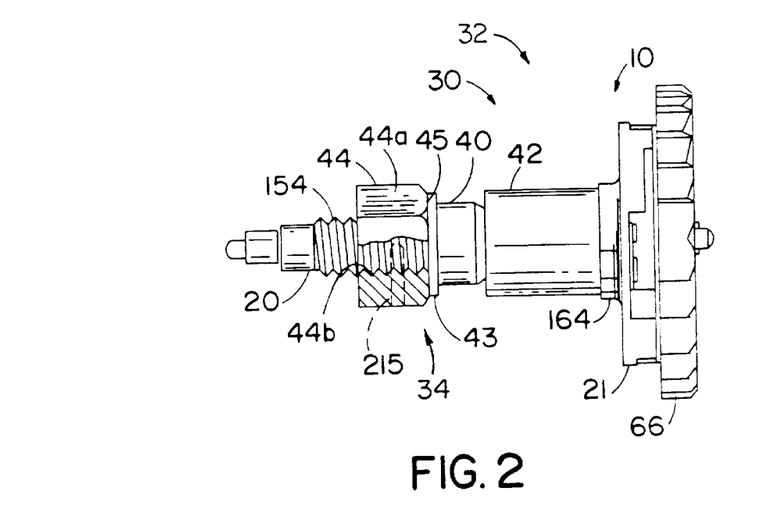
FIG. 2 is a side elevational view of the energy management system according to the invention and showing the driving and extruding mechanism, shaft head and a lock gear mounted on the reel shaft.

An energy dissipation assembly 30 of the energy management system 10 is shown in FIG. 2 and includes the threaded shaft 20 mounting driving and extruding mechanism 32. The driving and extruding mechanism 32 includes a driver 34, a driven member 36 and a deformable member 38, all mounted on threaded shaft 20. As previously mentioned, once the load on the belt 12 reaches the predetermined onset tension load, a predetermined length of protraction of the belt 12 can occur while maintaining the force between the occupant and belt 12 within a controlled, predictable force range. In the specific example described herein, the predetermined force level can be 700 lbs. and over and the protraction length can be as long as approximately 20 inches or 3.5 revolutions of the reel cylinder assembly 22. Once the onset load reaches 700 lbs., the driver 34 will push against the driven member 36 causing it to deform the deformable member 38 thus dissipating energy and maintaining the force range between approximately 700 to 900 lbs. as programmed in this illustrated embodiment of the invention as will be described in greater detail hereinafter. Alternatively, it is also contemplated that the driver push and drive a member over an integral section on the shaft so that the driven member is deformed as it is pushed, which will be more fully described herein with reference to FIGS. 15 and 16. As will be explained in detail hereinafter in connection with FIGS. 14A–14D and FIG. 17, the illustrated energy management system 10 may reduce very substantially force loads and chest deflections, e.g., a reduction in the maximum shoulder belt load from about 3,000 lbs. to about 800 lbs., a reduction in G forces from about 60 G's to 30 G's, and sternum deflection from about two inches to one inch. Manifestly, these reductions are given by way of example only and are not limitations with respect to the invention.

As will be explained in greater detail hereinafter, the driving and extruding mechanism 32 is only able to dissipate energy as described above when one or both of the inertia sensors have been activated to cause a stopping of the rotation of shaft 20. The reel cylinder 22 is rotated relative to the shaft 20 only when belt loads reach at least the threshold seat belt tensile force with the driver 34 moving axially down along the shaft 20 and pushing the driven member 36 against the deformable member 38.

Figure 15:
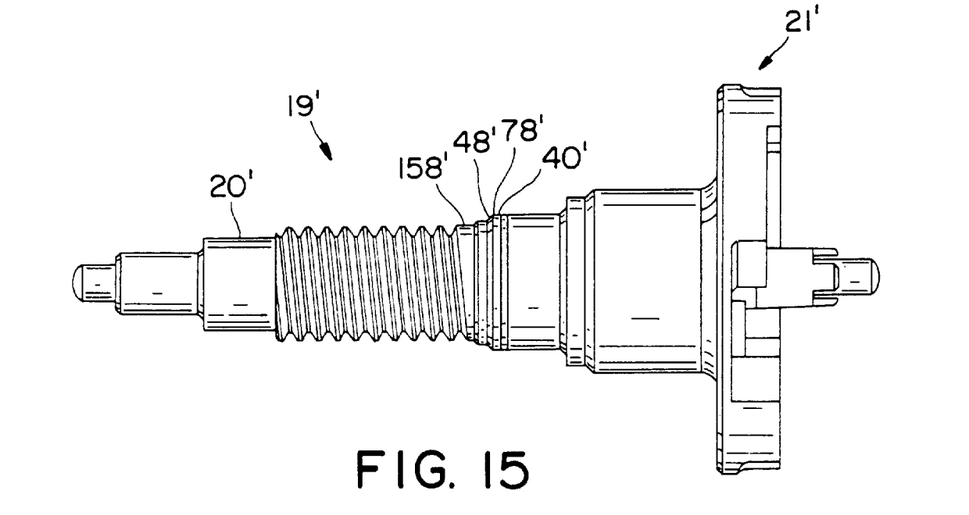
FIG. 15 is a side elevational view similar to FIG. 8A of a modified shaft assembly according to the present invention showing the extrusion die formed integrally on the shaft.
Figure 16:
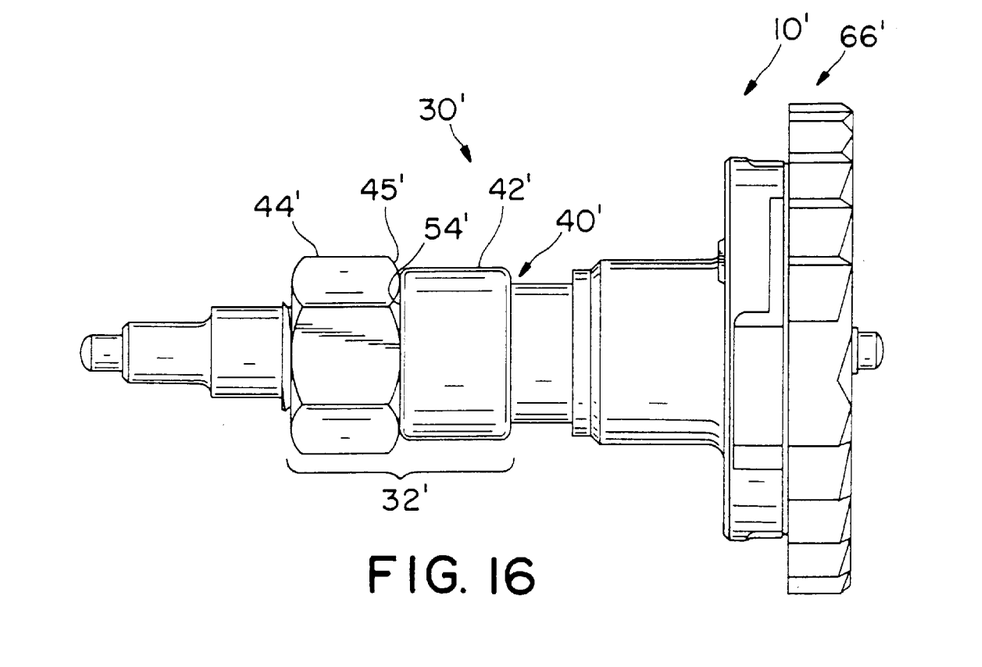
FIG. 16 is a side elevational view of the modified shaft assembly of FIG. 15, including the driver nut, deformable bushing and lock gear mounted on the reel shaft.

The configuration of the driving and extruding mechanism 32, and more particularly the driven member 36 and deformable member 38, can be such that they cooperate to produce relatively flat smooth load curves, as will be explained hereinafter in connection with FIGS. 14A–14D, on the shoulder belt 12 once the threshold force has been reached. Also, as will be explained in connection hereinafter, the configuration of the driven member and deformable member can be changed to provide various load curves. Referring to FIGS. 3A–3C and FIG. 4, the driven member 36 is shown in the form of extrusion die 40 and the deformable member 38 is shown in the form of a tube or bushing 42. Alternatively, the extrusion die can be formed integrally on the shaft as previously mentioned, such as extrusion die section 40' formed on modified shaft 20', as shown in FIGS. 15 and 16. The driver 34 is preferably a conventional hexagonal nut 44 having exterior flats 44a and internal threads 44b with the nut 44, extrusion die 40 and bushing 42, all mounted on threaded shaft 20, as shown in FIG. 2.

In this instance, the nut 44 is threaded on the shaft threads 20a to abut the adjacent end of the extrusion die 40, which in turn, is abutting the adjacent end of the bushing 42 so that the die begins deformation of the bushing 42 once onset force level is exceeded. It takes the onset force level being applied to the belt before nut 44 begins to turn on the threaded shaft 20 to deform the bushing. That is, the nut 44 begins to turn on the threaded shaft to deform the tubular wall of the bushing outwardly only when sufficient force is being applied to the nut to deform the engaged bushing wall. The nut moves along the threaded shaft to the extent that the deformed bushing allows. If the force being applied to the nut is less than will deform the bushing tubular wall, then no deformation occurs; and the nut cannot travel along the threaded shaft. The onset force level is the level of force needed to begin deformation of the tubular bushing wall, which is 700 lbs. in the embodiment of the invention described herein.

Figure 3A:
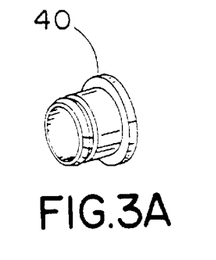
FIG. 3A is a perspective view of a driven extrusion die member of the driving and extruding mechanism of FIGS. 1 and 2.
Figure 3B:
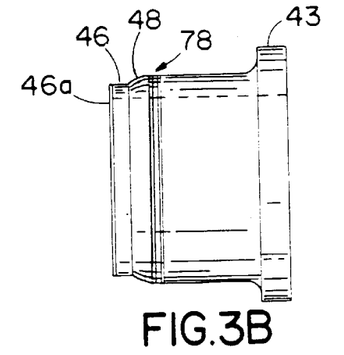
FIG. 3B is an enlarged side elevational view of the driven extruder member of FIG. 3A.
Figure 3C:
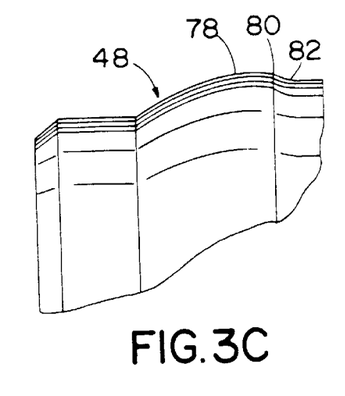
FIG. 3C is an enlarged, fragmentary view of a portion of the extrusion die member of FIGS. 3A and 3B showing the profile of the nose, annular bead and relief wall behind the annular bead.
Figure 4:
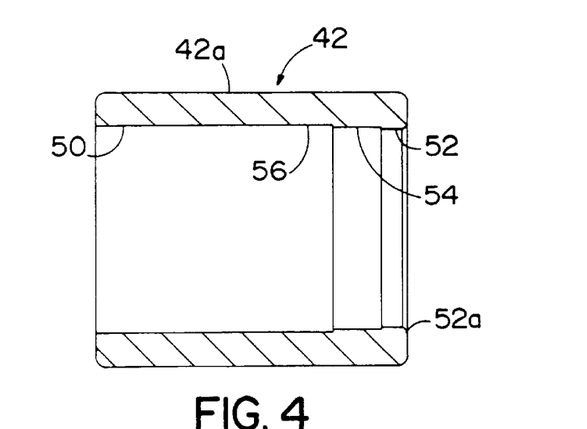
FIG. 4 is a side sectional view of a deformable bushing of the driving and extruding mechanism of FIGS. 1 and 2.
Figure 5:
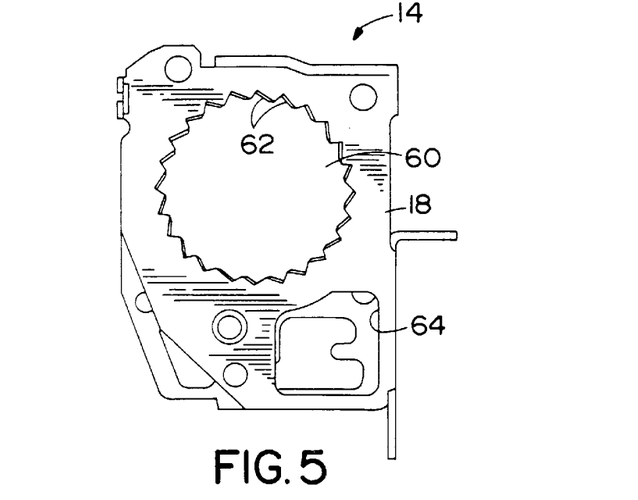
FIG. 5 is a side elevational view of the retractor frame having an end wall with a toothed opening formed therein and a lower support opening for a vehicle sensitive inertia operator.

As previously discussed, it is usually desirable that the shoulder belt load avoid sharp increases such as may be caused by loose play between the extrusion die 40 and bushing 42. In this regard, the nut 44 has end face 45 abutting against end flange 43 of the extrusion die 40 as assembled on the shaft 19. In addition, the extrusion die 40 is provided with a small diameter annular nose portion 46 preferably chamfered at its leading end 46a and a conical portion 48 rearward of the nose portion 46 and extending outwardly therefrom with a progressively increasing diameter, as best seen in FIGS. 3B and 3C. As shown in FIG. 4, the bushing 42 has a bore wall 50 with a small diameter annular bore wall portion 52 at one end leading to an intermediate larger diameter annular bore wall portion 54 which steps down and opens to a largest diameter bore wall portion 56 extending to the other end of the bushing 42. The small diameter bore wall 52 and the conical portion 48 of the extrusion die 40 are sized so that with the extrusion die 40 and the bushing 42 assembled and mounted on the threaded shaft 20, the extrusion die 40 abuts an adjacent opening wall in the bushing 42 (FIG. 2) such that there is no loose play between the two as would cause a spike in the load on the shoulder belting 12 as the nut driver 44 begins to push the extrusion die 40 into the bore 50 of the bushing 42. That is, if the nut is spaced from the bushing and begins to travel and then bangs into the bushing with an impact force, the force level has been found to raise sharply and then to drop lower after the impact; and this is called a spike in the load. When the die 40 abuts the bushing, the force load is more uniform; and there is no sharp rise and drop of the force level, i.e., the spike. If desired, the small bore entry portion 52a can be chamfered to facilitate a press fit frictional engagement with the conical portion 48 of the extrusion die 40.

The energy management system 10 can also be modified as described earlier with the extrusion die 40 formed integrally on the shaft. Elements of a modified version of the energy management system 10' shown in FIGS. 15 and 16 corresponding to the elements of energy management system 10 will be identified with the same reference numerals only primed in the description below. With the modified energy management system 10' having an energy dissipation assembly 30' including threaded shaft 20' mounting driving and extruding mechanism 32' and shaft head 21' and lock gear 66', the nut 44' will have its end face 45' abutting against the outside end 51' of the bushing 42' adjacent its large-diameter bore wall. The small-diameter bore wall at the other end of the bushing 42' is press fit onto the extrusion die section 40' of the shaft 20' similar to the bushing and die of the driving and extruding mechanism 32, as seen in FIG. 16.

As previously mentioned, the reel shaft assembly 19 is mounted on and extends through the end walls 16 and 18 of the frame 14. The end walls 16 and 18 are each provided with respective openings 58 and 60 (FIG. 1) coaxial with the shaft 20. Each of the openings 58 and 60 have notches or teeth 62 (FIG. 5) formed about their peripheries. Referring to FIGS. 5 and 7A–7C, the frame 14 also includes a lower support opening 64 for the vehicle sensitive inertia operator 26 (FIG. 6) which will be described in more detail hereinafter. With the shaft 20 coaxial with the openings 58 and 60, the shaft head 21 will be mounted substantially within the toothed opening 60. Adjacent the opening 60, a lock gear 66 is mounted to the shaft assembly 19. The lock gear 66 includes the web sensitive inertia operator assembly 28. The lock gear 66 also is provided with exterior teeth 68 formed about its outer periphery.

To lock the shaft assembly 19 against rotation, a lock is provided in the form of pawl assembly 70 (FIGS. 7A–7C) which cooperates with the teeth 62 about frame opening 60 to lock the reel 22 against rotation relative to the frame 14. The pawl assembly 70 includes a pawl 72 and a mounting pin 74 for securing the pawl 72 to the shaft head 21 and in operative relation to the lock gear 66. The pawl 72 includes pawl teeth 76 which, when the reel lock is moved to its operative locking position, are caused to move radially outwardly and engage the teeth 62 about the opening 60 of the frame 14, thus locking the shaft assembly 19 against rotation relative to the frame 14. The pawl assembly lock 70 is pivotally moved to its operative position upon activation of either the vehicle sensitive inertia operator 26 or the web sensitive inertia operator 28 or both of them. This stops rotation of the shaft 20 and further belt protraction which will be the normal operating condition. The retractor illustrated in the drawings is a well-known, commercially available retractor sold by Takata Inc. of Auburn Hills, Mich. It is only at the time of accident and at belt threshold loads that the driving and extruding mechanism 32 begins to dissipate energy allowing limited belt protraction and reel rotation. Until this threshold force is applied to the belt, the reel cylinder assembly 22 and driver nut 44 will rotate with the shaft assembly 19 by virtue of the driver nut 44 being provided with a matching external profile with that of the internal profile of the reel cylinder assembly 22, as will be fully described hereinafter.

With the pawl 72 engaged with the frame teeth 62 and a threshold load being applied by the seat belt trying to turn the reel against the locking action of the pawl and frame teeth 62, the interference fit and deforming force level has been achieved such that the locked reel assembly now begins, for the first time, to rotate relative to the threaded shaft 20 with the nut 44 turning on the shaft threads 20a and traveling axially along the reel shaft to deform the bushing 42 as the reel assembly turns the nut.

More specifically, once the onset, force level of 700 lbs. is exceeded, the reel assembly 22 starts to turn rotating the driver nut 44 relative to the locked shaft 20 which pushes the extrusion die 40 axially further into the bushing 42 with the die conical portion 48 sliding along the bore wall entry portion 52a causing the bushing 42 to deform by enlarging the bore wall diameter to fit the extrusion die 40 therein. To provide a smooth camming action and prevent the extrusion die 40 from biting or cutting into the bore wall 50 as the extrusion die 40 is driven into the bushing 42, the conical cam portion 48 includes a raised arcuate bead section 78 that is formed at the point at which the conical portion 48 has its largest diameter, as best seen in FIG. 3C. The raised bead 78 extends from its juncture with the conical cam portion 48 rearwardly with a smooth curved profile to a drop-off shoulder 80 which then meets slightly lowered smaller diameter annular relief wall portion 82. At the rear of the relief wall 82, the enlarged flange 43 can be provided against which the end face 45 of the nut 44 is abutted for pushing axially thereagainst and for limiting the extent of travel of the extrusion die 40 into the bushing 42.

With the earlier described modified energy management system 10', once the predetermined force is exceeded and the nut 441 starts to rotate relative to the locked shaft 20', the nut 44' will push the bushing 42' axially further over the extrusion die section 40' with the die conical portion 48' thereof camming against the bore wall causing the bushing 42' to deform, as described with respect to energy management system 10. Also, the energy management system 10', and specifically the extrusion die section 40' thereof, includes a raised bead 78' for smoothly camming against the bore wall during bushing deformation and energy dissipation.

Thus, with the raised bead 78, the extrusion die 40 avoids any sharply angled surfaces, such as the edge formed between the inclined wall and large diameter wall in applicant's earlier extruder which can skive or cut into the bore wall 50. The raised bead 78 will not dig into the bore wall 50 and instead will provide the desired smooth camming action as the extrusion die 40 is driven into the bushing 42. Also, by the provision of the bead 78, the driver nut 34 is not pushing a plug of material through the bushing 42, but instead is pushing a ring of material therethrough with less surface-to-surface contact and which allows the bushing wall 50 to collapse about the relief wall 82 behind the bead 78. Without the provision of the bead 78, as more of the plug was driven into the bushing bore 50, there would be an increase in the contacting surface area between the die and bore wall which accordingly would progressively increase resistance to axial movement and increase the loads required to dissipate energy by deforming the bore wall 50. With the bead 78, frictional resistance is more constant with little buildup yielding more consistent results in terms of the load range produced during deformation of the bore wall 50 and dissipation of energy. The bead 78' also has the same effect, as the bushing 42' when being pushed by the nut 44' over the bead 78' will not encounter any sharply angled surfaces providing a smoother camming action.

The extrusion die 40 is mounted on the threaded shaft 20 with its nose abutting the bushing 42, as previously described, with the nose 46 extending slightly into the bushing bore 50. Once the onset force level is exceeded, the driver nut 34 starts to push and drive the extrusion die 40 into the bushing 42 causing the raised bead 78 to be displaced within the bore 50 and travel through the stepped portions 52 thereof. Operation of the energy dissipation assembly 30 is preferably coordinated with that of deployment of an air bag so that the bead 78 will travel a predetermined distance in the bushing bore 50 before the bag deployment reduces the load exerted on the belting 12 by the restrained occupant and thus on the reel assembly 22 and nut 44 keyed thereto sufficiently so that the driver nut 44 no longer exerts a sufficient axial force against the extrusion die 40 to push the die 40 and deform the bushing 42 allowing the driver nut 44 to move axially. The 6 mm of bead travel in the bushing 42 corresponds to approximately 3.5 revolutions of the reel assembly 22 which yields about 20 inches of belt payout.

Figure 14A:
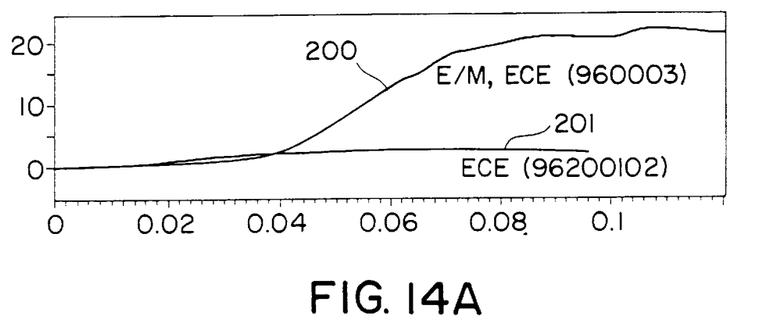
FIGS. 14A–14D are graphs comparing the results of testing done on the retractors with and without the driving and extruding mechanism according to the present invention.
Figure 14B:
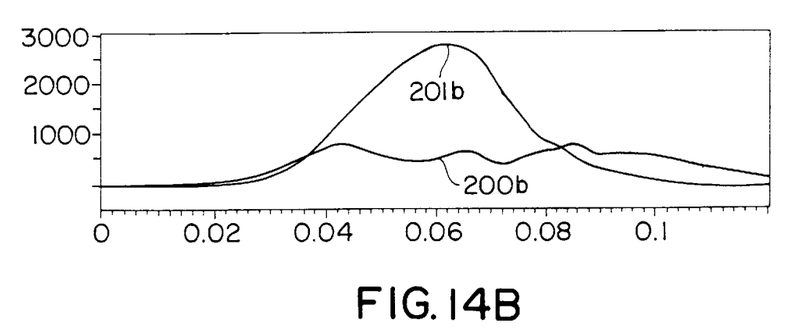
Figure 14C:
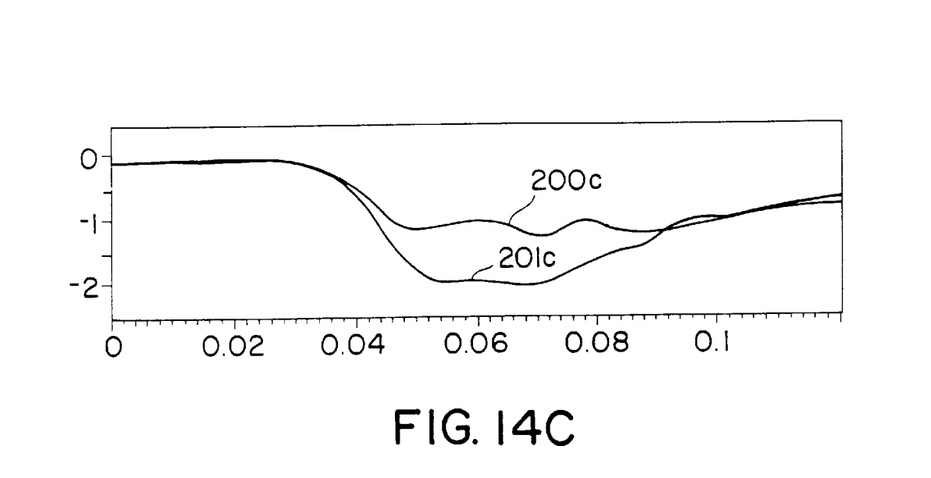
Figure 14D:
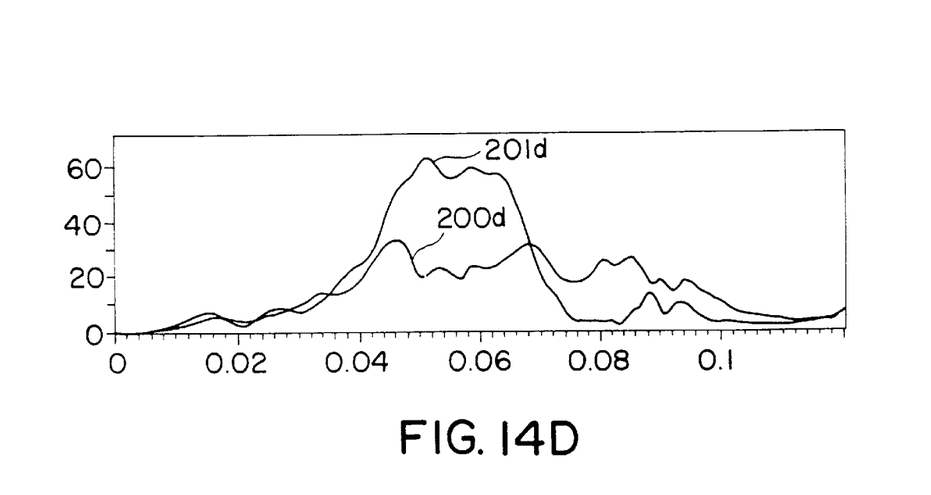

The graphs of FIGS. 14A–14D illustrate results of testing using the illustrated embodiment of the invention and to a particular vehicle having crash characteristics such that it is desired to have twenty inches of belt protraction and a substantially smooth 800 lb. force load on the shoulder belt over the time that twenty-inch belt protraction occurs. FIG. 14A shows a curve 200 that illustrates the use of an energy management system which allows a belt payout which reaches approximately 20 inches approximately 0.1 second after impact. The energy management system differs from the other standard system, which is without an energy management system and which is designated by the term "Baseline" and is referenced as curve 201. Turning now to FIG. 14A, beginning at about 0.04 second, the energy management curve 200 begins to rise until the abrupt stop of payout of belt at 20 inches at 200*a* such as when the flange 43 of the die 40 hits the adjacent, annular end 42*a* of the bushing 42 to end the travel of the die. The curve 201 shows that the payout is only approximately 2.5 inches without an energy management system. Correspondingly, the graphs of FIGS. 14B and 14D show an increase in loads on-a person because of a lack of an energy management system 10 in comparison to the controlled forces and loads achieved with the present system 10. One of the more dramatic effects of the use of the seat belt energy management system of the present invention is the drop of the maximum peak load during the time period being experienced by the passenger from a maximum of about 3,000 lbs. (FIG. 14B) shown by Baseline curve 201*b* to about 800 lbs. shown by the energy dissipation curve 200*b*. As seen in the graph of FIGS. 14B, the maximum 800 lb. force is maintained over a relatively long period of time from about 0.04 to 0.10 second. On the other hand, the Baseline curve 201*b* shows a steep rise of force from about 800 lbs. to 3,000 lbs. from 0.04 to 0.06 second. Thus, this preferred and illustrated embodiment of invention not only provides for energy dissipation but is able to provide it in a controlled, even manner over the entire period of 0.10 second. This controlled force of a maximum of about 800 lbs. over the period of 0.10 second has been attained a number of times using sled and dummy tests, and hence, is a known and predictable result achieved by this illustrated embodiment of the invention.

Also, the illustrated energy management system is able to reduce the amount of deflection of the chest sternum by about 50%. As seen in FIG. 14C, the maximum sternum deflection without energy management is about two inches as shown by the Baseline curve 201*c*; while with energy management, the maximum sternum deflection is limited to about one inch to one and one quarter inch as illustrated by energy dissipation curve 200*c*. Again, the sharp increase of chest deflection is not allowed such as will occur from about 0.03 to 0.05 second for Baseline curve 201*c* when no energy dissipation is present. With the energy management system, the maximum deflection of about one inch is maintained over a a long period of time from 0.05 to 0.09 second. The maximum G load experienced by the passenger is dropped by about 50% by use of the energy management system, as shown in FIG. 14D. As shown in this graph of FIG. 14D, the maximum 60 G load at about 0.05 second shown in the Baseline curve 201*d* dropped to a maximum 30 G load as shown in curve 200*d* with the use of the energy management system of this invention. The sharp increase from about 30 G's to 60 G's over the period of 0.04 to 0.05 second has been eliminated, and a more level or parallel, prolonged application of 30 G's is achieved with the energy management system. Thus, it will be seen that very large energy dissipation in a known, controlled manner is achieved with a very small and inexpensive energy dissipation system. The results have been consistently obtained in tests with reasonable predictability. The system functions effectively to provide a longer distance over which to reduce the maximum forces and stretches the forces over a longer time period during which the air bag is being deployed.

Figure 17:
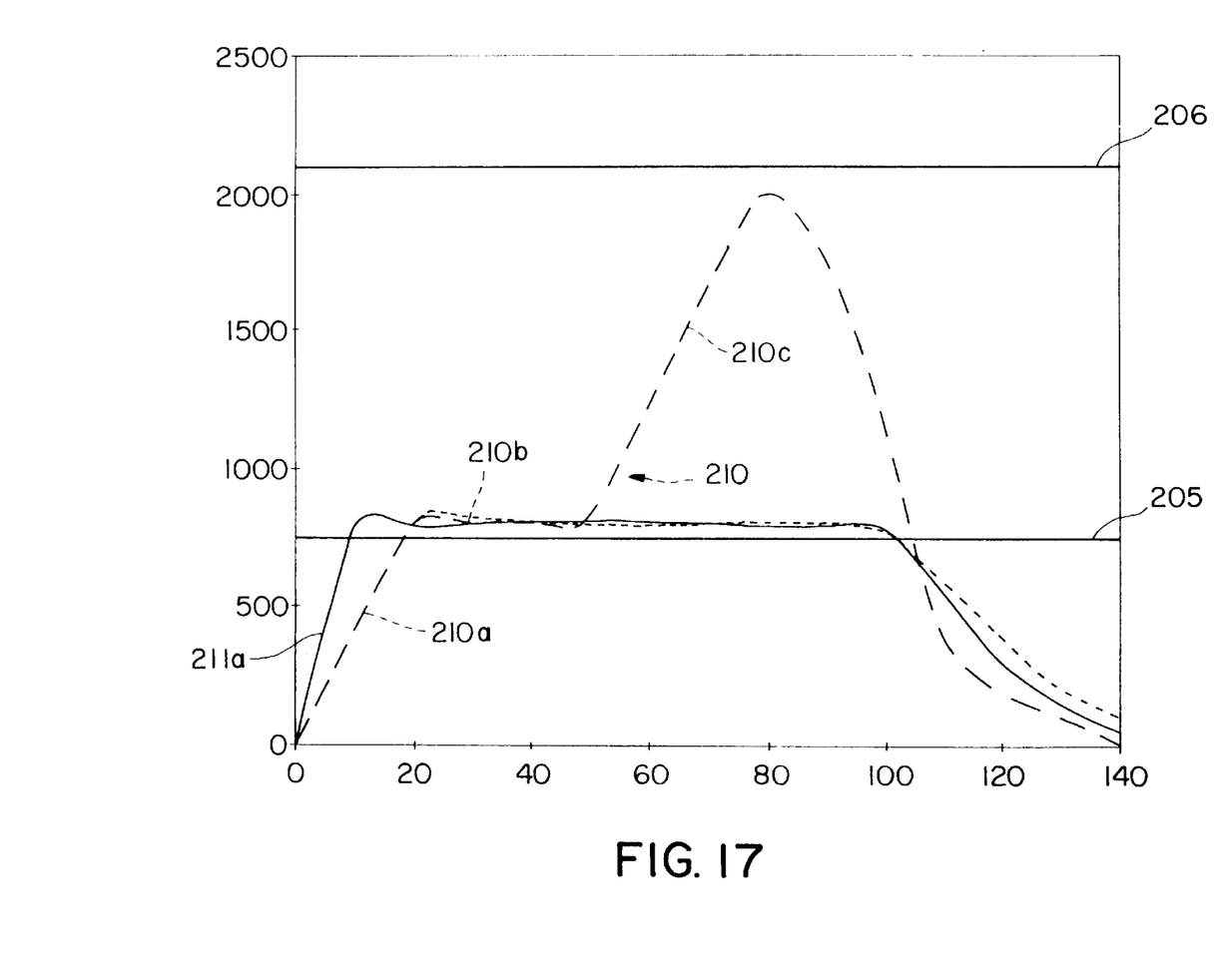
FIG. 17 is a view of shoulder belt loads versus time graph when using an energy management system of the present invention.

As will be best understood in connection with FIG. 17, the energy management system can be made to provide various shoulder belt load curves and various chest deflection curves tuned to a particular vehicle's crash characteristics. Generally speaking, the lower level for the onset or threshold force is usually at a low limit such as 700 lbs. shown by an onset lower parallel line 205 which, of course, can be raised anywhere up to about the maximum level line 206 at about 2,100 lbs. for a typical seat belt system. If the vehicle crash characteristics are desired to be increased, the thickness of the tubular member may be increased so that metal deformation does not begin at 700 lbs. but at a higher force level above the force level 205. On the other hand, if a lower force level 205 is desired, the wall thickness of the deformable member may be made thinner so that less force is needed to deform the tubular wall and to allow belt protraction while the retractor locking mechanism is active. It has been found that the tubular member should be made to fairly exacting standards of dimensions and materials or else the variation in dimension or material may result in inconsistent results. The repeatability and predictability shown can be obtained if the materials and dimensions of the deformable member are kept constant within close tolerances.

It is also possible to provide a quick onset force which can be understood by a comparison of a curve portion 210*a* with a curve portion 211*a* (FIG. 17) in which the energy dissipation, shown by the curve 211*a*, rises to about 800 lbs. in about ten milliseconds; whereas, the energy dissipation shown by curve 210*a* rises to about 800 lbs. in twenty milliseconds. The quicker obtaining of the energy dissipation, as shown by the curve 211*a*, may be obtained by the use of a restraint means or member that restrains the movement of the deformable member 38 relative to deforming member 36 with a sharp, quick application of the total force thereto. The preferred restraint member is a shear pin 215 which is shown in dotted lines in FIG. 2 and extends through the nut 44 and into an aperture in the reel shaft 20. At the shear force level of 700 lbs., the shear pin will break, and the immediate, quick application of 700 lbs. causes the belt load to rise more rapidly, as shown by the curve 211*a*. Other restraint means such as a locktight material could be used between the nut and screw thread rather than the shear pin 215.

If the vehicle's crash characteristics are such that the belt protraction should be limited, e.g., to about 6 inches versus the twenty inches of belt protraction as described in connection with FIGS. 14A–14D, the curve could be more like that of curve 210*a* (FIG. 17). As shown in curve 210, the energy absorption and metal deformation begins at about 20 milliseconds and maintains the force level at about 800 lbs.

over curve portion 210b from about 20 to 50 milliseconds, at which time the belt protraction has reached six inches and the extruder end flange 43 has hit the facing end wall of the bushing 42 stopping belt protraction and energy dissipation thereby causing the shoulder belt load to rise steeply, as shown by the curve portion 210c. If the air bag can be deployed between 60 and 70 milliseconds, the shoulder belt load should not reach the maximum of 2,000 lbs., as shown at curve portion 210d.

It will be appreciated that the foregoing curves described in connection with FIGS. 14A–14D and FIG. 17 are only examples, and that the various vehicle's crash characteristics will necessitate very substantially different looking energy dissipation curves than those described herein. The present invention is not limited to the examples described herein.

Figure 11A:
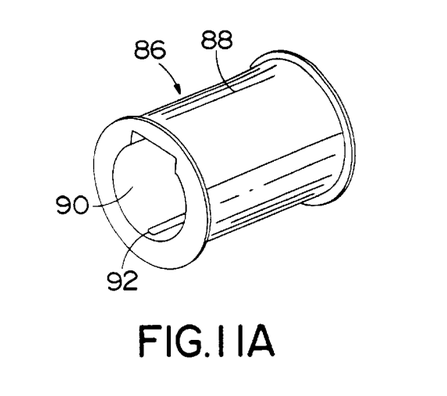
FIG. 11A is a perspective view of an outer spool member of the reel cylinder assembly.
Figure 11B:
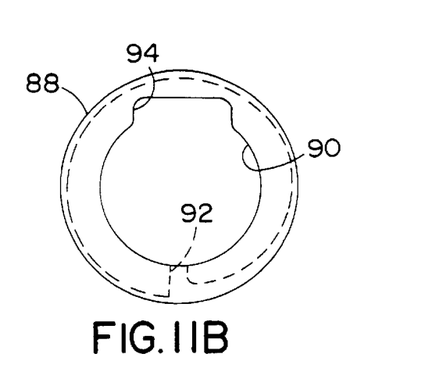
FIG. 11B is a front elevational view of the spool member of FIG. 11A showing its bore having an upper channel and a web receiving slot formed therein.
Figure 11C:
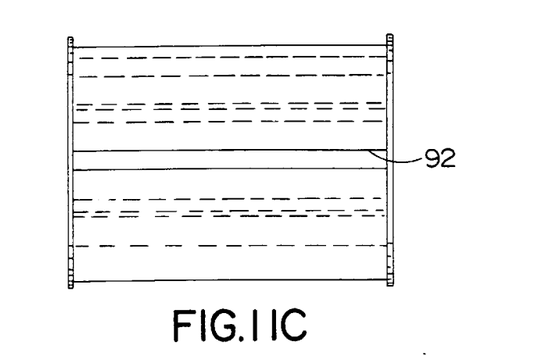
FIG. 11C is a bottom plan view of the spool member of FIGS. 11A and 11B.
Figure 12A:
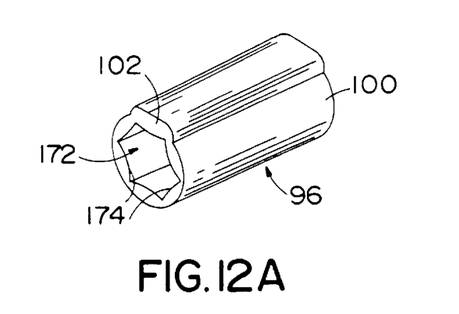
FIG. 12A is a perspective view of a cylinder insert for positioning in the spool bore.
Figure 12B:
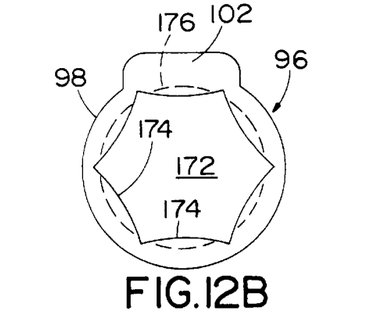
FIG. 12B is a front elevational view of the cylinder insert of FIG. 12A showing the hexagonal configuration of the insert bore at its front end.
Figure 12C:
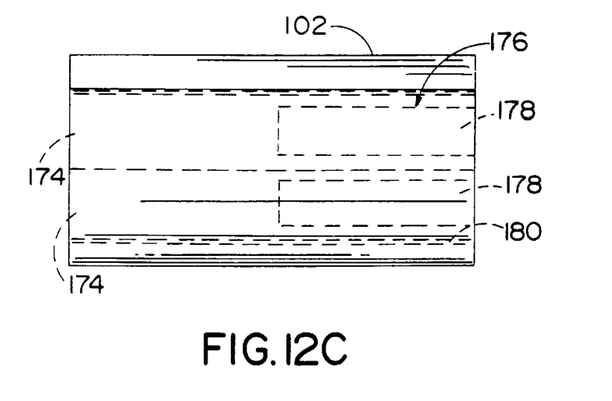
FIG. 12C is a side elevational view of the cylinder insert of FIGS. 12A and 12B showing the change in configuration of the bore midway along its length.
Figure 12D:
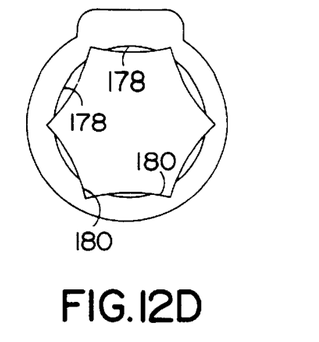
FIG. 12D is a rear elevational view of the cylinder insert of FIGS. 12A–12C showing the generally circular configuration of the bore at its rear end.

The preferred and illustrated retractor 5 will now be described in greater detail. The reel cylinder assembly 22 includes an exterior spool member 86 having an exterior cylindrical surface 88 on which the seat belt webbing 12 is wound for protraction and retraction, as best seen in FIGS. 11A–11C. The spool member 86 has a substantially annular bore 90 extending therethrough with a webbing-access slot 92 extending from the interior bore 90 to the exterior cylindrical surface 88 and axially along the length of the spool member 86. At the lower end of the annular bore 90 the access slot 92 is provided with a channel 94 being formed at the top of the annular bore 90. Referring to FIGS. 12A–12D, a cylinder insert 96 having an exterior surface 98 of a shape matching the configuration of the spool member bore 90 is provided for allowing the insert 96 to be placed non-rotatably into the bore 90. More particularly, the exterior surface 98 includes a lower cylindrical surface portion 100 and a raised surface portion 102 upstanding therefrom. As is apparent, for sliding the insert 96 into the bore 90, the raised surface section 102 should be aligned with channel 94. To capture the webbing 12 with the reel assembly 22, a loop is sewn at one end of the webbing with the loop inserted through the web access slot 92. Thereafter, the insert 96 is slid into the bore 90 with the webbing loop therearound to capture the loop of webbing between the outer surface 98 of the insert 96 and the bore wall 90 of the spool member 86 with the webbing extending through the slot 92 to be wrapped around the spool exterior cylindrical surface 88.

Figure 7A:
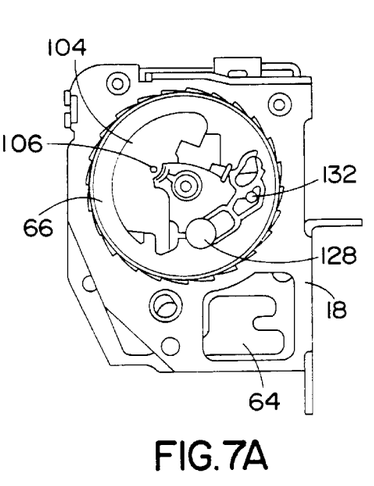
FIG. 7A is a view similar to FIG. 5 showing the position of the lock gear mounted to the reel shaft adjacent the toothed opening of the frame.
Figure 7B:
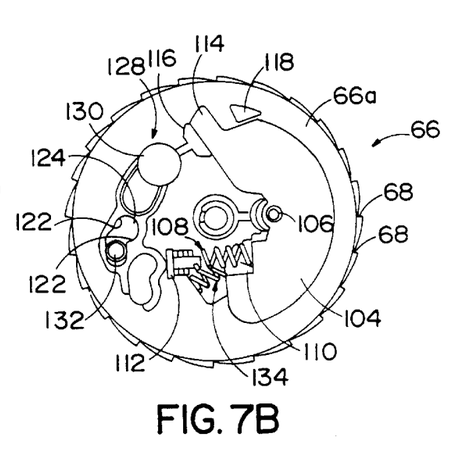
FIG. 7B is an enlarged elevational view of the lock gear of FIG. 7A with the frame removed and showing a web sensitive inertia operator including a flywheel pivotally mounted to the lock gear.
Figure 7C:
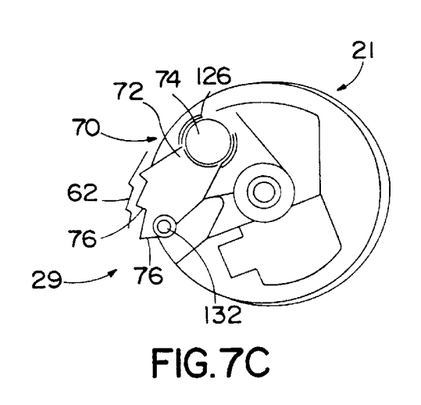
FIG. 7C is a view similar to FIG. 7B except with the lock gear removed to show the shaft head having a pawl which is in position to engage the teeth formed about the frame opening to stop rotation of the shaft assembly.
Figure 13A:
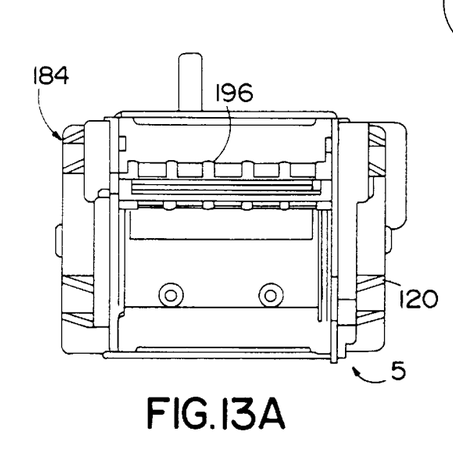
FIG. 13A is a top plan view of the retractor of FIG. 1 in its assembled form.
Figure 13B:
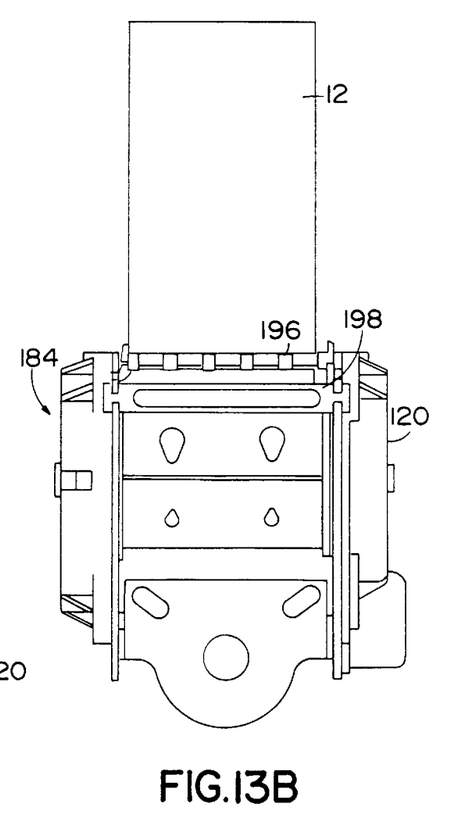
FIG. 13B is a front elevational view of the retractor of FIG. 13A.

Referring to FIGS. 7A and 7B, the web sensitive inertia operator 28 can take the form of a flywheel 104 which is pivotally mounted to the face 66a of lock gear 66 by pivot pin 106. A flywheel spring 108 pushes at one end on a shoulder 110 formed on the flywheel 104 and at its other end the spring 108 is connected to tab 112 molded on the lock gear face 66a. The flywheel spring 108 biases the flywheel 104 to a non-operative position so that a nose portion 114 of the flywheel 104 abuts against stop 116 on the lock gear face 66a. When the reel assembly 22 reaches a predetermined acceleration such as caused by sudden rapid protraction of the webbing 12 therefrom, the flywheel 104 will pivot about its pivot pin 106 in a clockwise direction from its inoperative position to an operative position moving the nose portion 114 away from the stop 116 and against a second stop 118 which is also molded integrally with the lock gear face 66a. In the operative position, the nose portion 114 will have been swung radially outwardly into the path of one of several internal projections or teeth (not shown) formed on a retainer 120 which encases the lock gear 66 and is connected to the outer side of the frame wall 18, as shown in FIGS. 13A and 13B.

Once the flywheel 104 moves to its operative position bringing its nose portion 114 into engagement with the projections formed on the retainer 120, the lock gear 66 will be prevented from rotation on the shaft 20. The stopping of rotation of the lock gear 66 results in the pawl 72 engaging the teeth 62 in the retractor frame 14 as will now be described in connection with FIGS. 7A–7B. The gear 66 has cam surfaces 122 formed therein which are sides of an arcuate-shaped hole 124 formed in the lock gear face 66a. The pawl 72 is pivotally mounted to the shaft head 21 in a circular recess 126 thereof by way of a mounting pin 128. The mounting pin 128 includes a circular head 130 and a shank extending therefrom with the shank being inserted through a hole in the lock gear face 66a and through an aligned hole in the pawl 72 to pin the pawl 72 to the circular recess 126. The pawl 72 carries a projecting cam pin 132 with the cam pin 132 projecting into the arcuate hole 124 in engagement with the cam surfaces 122 when the pawl 72 is pivotally pinned to the shaft head 21. The pawl 72 is normally biased by pawl spring 134 to an inoperative position with the pawl teeth 76 radially inward of the outer periphery of the shaft head 21. However, once the lock gear 66 is prevented from rotation as when the web sensitive inertia operator 28, and more particularly the flywheel 104 is moved to its operative position, and the reel assembly 22 is still turning with the shaft head 21 also turning relative to the stationary gear camming surfaces 122, the latter cams the pawl pin 132 and pawl 72 radially outwardly to cause the pawl teeth 76 to move into engagement with the frame teeth 62 thus locking the shaft assembly against further rotation into the frame 14.

Figure 6:
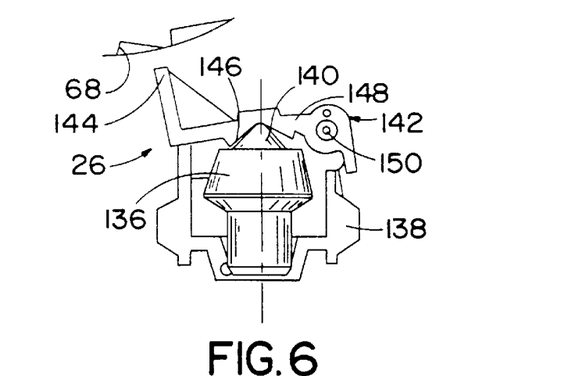
FIG. 6 is a side elevational view of the vehicle sensitive inertia operator having an inertia weight mounted in a sensor case.

The vehicle sensitive inertia operator 26 operates similarly in that it stops rotation of lock gear 66 causing the pawl teeth 76 to engage the frame teeth 62 locking the shaft assembly 19 against rotation into the frame 14. Referring to FIG. 6, the vehicle sensitive inertia operator 26 includes an inertia weight 136 which is mounted to stand vertically in a sensor case 138 for tilting or tipping movement at vehicle deceleration to pivot a rounded nose 140 on the inertia weight 136 to lift a pivotally mounted actuator pick 142 for insertion of its upturned finger 144 into the outer peripheral teeth 68 of the rotating lock gear 66 to arrest the turning of the lock gear 66. The upper rounded end 140 of the inertia weight 136 is positioned within and engages a concave seat 146 on the underside of the pick 142, which is in the form of a lever 148 that is pivotally mounted by a pivot pin 150 to the sensor case 138. This case 138 and a housing cover 152 (FIG. 1) therefore are inserted into and secured at support opening 64 in the end wall 18 of retractor frame 14.

At the time of vehicle deceleration of sufficient magnitude, the weight 136 topples to lift the finger 144 of the pick 142 into engagement with the teeth 68 of the lock gear 66. This will stop the rotary motion of the lock gear 66 as caused by rotation of the reel assembly 22 and shaft assembly 19. As mentioned above, once the lock gear 66 has stopped turning, the cam pin 132 will cam against the cam surfaces 122 of arcuate hole 124 causing the pawl 72 and its teeth 76 to move radially outwardly with the teeth 76 engaging the teeth 62 of the frame 14 stopping rotation of the shaft assembly 19, and the reel cylinder assembly 22 until the predetermined threshold force load on the seat belt webbing 12, i.e., 700 lbs., has been reached.

Referring to FIGS. 8A and 8B, 9A and 9B, and 10A and 10B, the details of the shaft assembly 19 will now be described. As can be seen, the shaft head 21 (FIGS. 10A and 10B) is mounted on the threaded shaft 20 (FIGS. 9A and 9B) for rotation therewith. More specifically, the shaft 20 has an intermediate threaded section 154 and cylindrical sections 156 and 158 on either side of the threaded sections 154.

Forwardly of cylindrical section 158 there is an enlarged hexagonal section 160 from which extends a lesser rod section 162. With the shaft 20', the cylindrical section 158' includes the extrusion die section 40' formed thereon. For mounting the back of the shaft head 21 to the shaft 20, a short rear annular mounting section 164 is provided on the shaft head 21. The annular mounting section 164 has an internal bore 166 with a matching hexagonal configuration to the hexagonal section 160 of the shaft 20. To mount the shaft head 21 onto the shaft 20, the shaft head hex bore 166 is aligned with the shaft 20 so that the cylindrical section 156, threaded section 154 and cylindrical section 158 can be slid through the hex bore 166 and tightly fitted onto hexagonal section 160 with the flats of the hexagonal section 160 engaging the flats of the hexagonal bore 166. An annular lip 168 is formed at the rear of the bore for limiting forward movement of the shaft head 21 by engagement of the lip 168 with shoulder 170 formed between the cylindrical section 158 and enlarged hexagonal section 160.

The driving and extruding mechanism 32 is mounted on the shaft 20 so that the internal threads of the nut 44 are mated on the threaded section 154 of the shaft 20 adjacent the cylindrical section 156. The bushing 42 is mounted on the shaft 20 with one end abutted against the lip 168 of the shaft head annular mounting portion 164 and the other end having the nose 46 of the extrusion die 40 press fit therein, as described earlier and shown in FIG. 2.

Returning to FIGS. 12A–12D, to provide a keyed fit between the reel cylinder assembly 22 and the nut 44, the cylinder insert 96 has an axial throughbore 172 machined with a slightly modified hexagonal configuration along its entire extent with the walls 174 of the bore having a slightly inwardly bowed or convex configuration, as best seen in FIG. 12B. Approximately mid-way along the length of the bore 172, a substantially circular section 176 of the bore 172 is formed with the diameter of the circular section 176 being slightly less than the distance between the corners of the walls 174 so that at the circular section 176 of the bore 172, there are curved portions 178 of the throughbore walls and corner portions 180. The diameter of the circular section 176 is preferably only slightly greater than that of the die annular flange 43, so that with the diameter at 19 mm, the circular section diameter can be approximately 20.70 mm. The nut 44 of the driving and extruding mechanism 32 can be initially mounted on the shaft in the hexagonal section of the throughbore 172 defined by the slightly concave walls 174 so that the flats 44a of the hexagonal nut 44 engage the walls 174. In this manner, rotation of the reel cylinder assembly 22 also causes rotation of the hex nut 44 mounted on the screw thread section 154 of the shaft 20 causing it to push against the flange 43 of the extrusion die 40. The bushing 42 and extrusion die 40 are mounted on the shaft 20 so that they are in the circular section 176 of the insert throughbore 172 with the die flange 43 substantially guided by the curved portions 178 of the bore walls as it is pushed therein by the nut 44. During energy dissipation, the nut 44 will enter the circular section 176 and still be non-rotatably received therein relative to the reel 22 as its corners will seat in the corner portions 180 of the bore circular section 172.

As previously mentioned, the retractor 5 includes a return spring assembly 24. The return spring assembly 24 has a coiled spring 182 mounted in a spring cover 184 with an inner end 186 of the spring 182 fastened to a shaft coupler or bushing 188. The bushing 188 has an opening 190 which are defined by flat walls 190a on either side thereof with the shaft having a coupling section 192 (FIGS. 9A and 9D) with a flat side 192a formed thereon for engaging one of the sides 190a of the opening 190 for mounting the bushing 188 on the coupling section 192 of the shaft 20 to rotate the shaft 20 in the rewind or belt retraction direction. The outer end of the spring is fastened to a spring case 194 which is suitably fastened to the spring cover 184 which, in turn, is secured to the outer side of the frame end wall 16 (FIGS. 13A and 13B). At the opposite side of the retractor 5, the retainer cover 120 is mounted to the outer side of the frame end wall 18 enclosing lock gear 66 and its rotating flywheel 104. A webbing guide 196 and tie bar 198 are also mounted to the frame 14 between its end walls 16 and 18.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A seat belt system having a controlled force energy management system tuned to a vehicle's crash performance characteristics, the seat belt system comprising:

a retractor reel carrying a seat belt including a shoulder belt wound thereon for protraction and retraction;

a reel shaft mounting the reel for rotation relative to the shaft at tensile forces applied to the seat belt above a predetermined tensile onset force;

a lock connected to the reel responsive to a predetermined condition to stop rotation of the reel and shaft up to the predetermined tensile onset force on the seat belt, the reel shaft rotating with the reel to allow the belt to be freely protracted therefrom until the occurrence of the predetermined condition;

a thread on the reel shaft;

a threaded nut mounted on the thread for axial travel along the reel shaft, the nut rotating with the reel shaft without axial travel thereon during free protraction of the belt until the occurrence of the predetermined condition;

a tubular member mounted on the shaft having a wall of a predetermined wall thickness and material to be deformed to dissipate energy in a controlled predetermined manner; and a deforming member movable relative to the tubular member upon application of the onset force to the seat belt and having a profiled surface to cooperate with the tubular member to deform the same in a radially outward direction to dissipate energy in the controlled predetermined manner by limiting the shoulder belt loads and belt extraction to predetermined ranges thereof over a predetermined time period to provide an energy management system tuned to a particular vehicle's crash performance characteristics, the relative movement caused by the locking of the reel shaft against rotation upon occurrence of the predetermined condition and rotation of the reel relative to the locked shaft at forces at and above the onset force with the reel rotation rotating the nut to cause the nut to travel axially along the locked shaft.

2. An apparatus in accordance with claim 1 including a stop for stopping the relative movement between the tubular member and deforming member after a predetermined amount of belt protraction during energy dissipation.

3. An apparatus in accordance with claim 2 wherein the stop comprises abutting stop portions on the tubular member and the deforming member.

4. The seat belt system of claim 1 wherein the deforming member is an integral portion of the reel shaft.

5. The seat belt system of claim 1 wherein the deforming member is a discrete extruder die slidably mounted on the reel shaft.

6. The seat belt system of claim 1 wherein the deforming member is a discrete extrusion die slidably mounted on the reel shaft; and the extrusion die includes an inclined wall and a raised bead at the top of the inclined wall for being driven in a tubular bore defined by the tubular member camming against and deforming the tubular member's wall as the bead is driven in the tubular bore by the nut.

7. The seat belt system of claim 6 wherein the extrusion die includes a smaller diameter annular relief wall behind the raised bead to allow portions of the tubular member wall behind the raised bead to resiliently rebound onto the relief wall as the bead cams past the tubular member wall portions.

8. The seat belt system of claim 1 wherein the deforming member is a discrete extrusion die slidably mounted on the reel shaft; and the tubular wall has a stepped inner surface for engagement with the extrusion die.

9. The seat belt system of claim 1 wherein the deforming member is a discrete extrusion die slidably mounted on the reel shaft; and the tubular member has a bore wall inner surface enlarging in diameter from a front of the bore wall to a rear of the bore wall.

10. A seat belt system in a vehicle having a controlled force energy management mechanism, the seat belt system comprising:

a frame;

a reel mounted to the frame for rotation about an axis and carrying a seat belt wound thereon for protraction and retraction;

a lock connected to the reel and movable between an inoperative non-locking position and an operative locking position where rotation of the reel relative to the frame in the belt protraction direction is prevented up to a predetermined tensile force on the seat belt with the lock moving from its inoperative position to its operative position upon one of (1) rapid rotation of the reel in the seat belt protraction direction, and (2) rapid deceleration of the vehicle;

a rotatable reel shaft mounted in the frame to rotate with the reel and to be locked by the lock to the frame to prevent rotation of the shaft;

a screw thread on the reel shaft;

a nut mounted on a thread on the reel shaft;

an energy dissipating tube mounted on the reel shaft having a wall deformable to dissipate energy; and an energy extruder profiled surface on the reel shaft to deform the tube in a controlled manner to maintain the tension force on the belt within predetermined limits when a threshold force is exceeded.

11. The seat belt system of claim 10 wherein the lock comprises a web sensitive inertia operated lock and a vehicle sensitive inertia operated lock with the web sensitive lock moving to its operative position upon rapid rotation of the reel in the seat belt protraction direction and the vehicle sensitive lock moving to its operative position upon rapid deceleration of the vehicle.

12. The seat belt system of claim 10 wherein the energy profiled surface includes an extrudable member and the profiled surface is formed integrally on the shaft with the extrudable member being driven axially in deforming engagement with the profiled surface to deform the extrudable member.

13. A method of providing a controlled force energy management for a seat belt retractor having a reel and attached seat belt including a shoulder belt, a threaded rotatable reel shaft, an inertia operated locking mechanism, and a tubular member to be deformed by a threaded driving member threaded on the reel shaft and a deforming member which is movable relative to the tubular member during belt protraction while the retractor is in a locked condition, said method comprising the steps of:

rotating the reel shaft and reel together with the nut on the shaft during belt protraction with the retractor in an unlocked condition;

locking the reel shaft and thereby the seat belt retractor against further belt protraction by the inertia-operated locking mechanism upon occurrence of a predetermined condition to shift the retractor from the unlocked condition into the locked condition;

applying a force load to the shoulder belt by an occupant restrained therewith in excess of a predetermined onset force to cause the reel to rotate relative to the locked reel shaft for further controlled belt protraction with energy dissipation; and rotating the reel with the tubular member being deformed by the deforming member as the threaded driving member travels axially along the threads of the locked reel shaft and dissipating energy to keep the shoulder belt force on the occupant's shoulder within a predetermined level of force during a further predetermined amount of belt extraction over a predetermined period of time, the rotating of the reel relative to the locked shaft causing the deforming member to enter the tubular member and deform a tubular wall thereof radially outwardly.

14. A method in accordance with claim 13 including the step allowing the seat belt to protract, and a turning of the reel through a plurality of revolutions with energy being dissipated to result in a predetermined force level range being achieved over a predetermined time interval which is matched to the crash performance characteristics for the vehicle.

* * * * *